July 10, 1956 W. C. DERSCH, JR 2,754,360

CHARACTER SYNTHESIZER

Filed Dec. 24, 1951 6 Sheets-Sheet 1

INVENTOR
WILLIAM C. DERSCH, JR.
BY Geoffrey Knight
ATTORNEY

July 10, 1956 W. C. DERSCH, JR 2,754,360

CHARACTER SYNTHESIZER

Filed Dec. 24, 1951 6 Sheets-Sheet 2

INVENTOR
WILLIAM C. DERSCH, JR.
BY Geoffrey Knight
ATTORNEY

INVENTOR
WILLIAM C. DERSCH, JR.
BY Geoffrey Knight
ATTORNEY

INVENTOR
WILLIAM C. DERSCH, JR.
BY Geoffrey Knight
ATTORNEY

July 10, 1956 W. C. DERSCH, JR 2,754,360

CHARACTER SYNTHESIZER

Filed Dec. 24, 1951 6 Sheets-Sheet 5

INVENTOR
WILLIAM C. DERSCH, JR.

BY Geoffrey Knight
ATTORNEY

INVENTOR
WILLIAM C. DERSCH, JR.
BY Geoffrey Knight
ATTORNEY 2,754,360

CHARACTER SYNTHESIZER

William C. Dersch, Jr., Vestal, N. Y., assignor to International Business Machines Corporation, New York, N. Y., a corporation of New York Application December 24, 1951, Serial No. 263,122

1 Claim. (Cl. 178—15)

This invention relates to electric apparatus and systems for character synthesis, and more particularly to high speed cathode ray character synthesizers.

One object of the invention is to provide an improved apparatus for converting code signals into legible characters at a high rate of speed.

In carrying out the invention means are provided to scan individual characters of a matrix, to generate voltage pulses to control a registering or recording device, the scanning being effected by means of a cathode ray, which has a basic scanning movement to cover an area equivalent to one character of the matrix and is further positioned in response to code signals to select individual characters for successive scannings.

In accordance with the foregoing, it is an object of this invention to provide apparatus for scanning in a selected order a plurality of symbol-containing areas.

Another object of this invention is to provide apparatus including a screen for reproducing symbols successively, and positioning said symbols in a sequential order across said screen.

Other objects of this invention will be pointed out in the following description and claims, and illustrated in the accompanying drawings, which disclose, by way of example, the principle of the invention and the best mode, which has been contemplated, of applying that principle.

One method for positioning a cathode ray beam in response to code symbols derived from a tape in order to record intelligence is shown in U. S. Patent No. 2,275,-017 issued to McNaney.

Throughout the description of this invention, trigger circuits are referred to; and more particularly, triggers are described as being either "on" or "off." Due to the nature of a trigger which comprises two reciprocally resistance-coupled vacuum tubes, the said trigger is maintained at one of two stable conditions, termed "on" and "off." When the left side of the trigger is conducting, the trigger is arbitrarily described as being "on." When the right side of the trigger is conducting, the trigger is arbitrarily described as "off."

A plurality of sequentially coupled triggers form a ring wherein the said triggers are rendered "on" successively by suitable successive voltage pulses. When, in addition thereto, the last trigger is coupled to the first trigger so that the first trigger is rendered "on" as the last trigger is rendered "off," the ring is more accurately termed a closed ring.

As is well-known in the electrical art, the point upon the fluorescent screen of a cathode ray tube at which an electron beam impinges, is controlled by voltages applied to deflection plates within the said tube. By applying suitable saw tooth sweep voltages to the said deflection plates, the electron beam may be casued to trace a similarly shaped pattern repeatedly. For example, if a first saw tooth voltage is applied to the vertical deflection plates, and a second saw tooth voltage with a frequency ten times the frequency of the first saw tooth voltage is applied to the horizontal deflection plates, the cathode ray electron beam will trace a rectangular shaped pattern upon the fluorescent screen. This tracing pattern as it is referred to throughout the description of this invention, will have a width determined by the magnitude of one horizontal saw tooth voltage pulse, and a length determined by the magnitude of one vertical saw tooth voltage pulse.

It is also well-known in the electrical art that the intensity of the electron beam within a cathode ray tube may be controlled by varying the bias voltage applied to its control grid. For the purposes of this description, the electron beam is referred to as being either on or off. When the cathode ray tube electron beam strikes its fluorescent screen so that visible light rays are emitted therefrom, the electron beam is arbitrarily described as being On. When the said electron beam fails to cause visible light rays to be emitted from its fluorescent screen, the electron beam is arbitrarily described as being "off."

*General description of operation*

Figure 1:
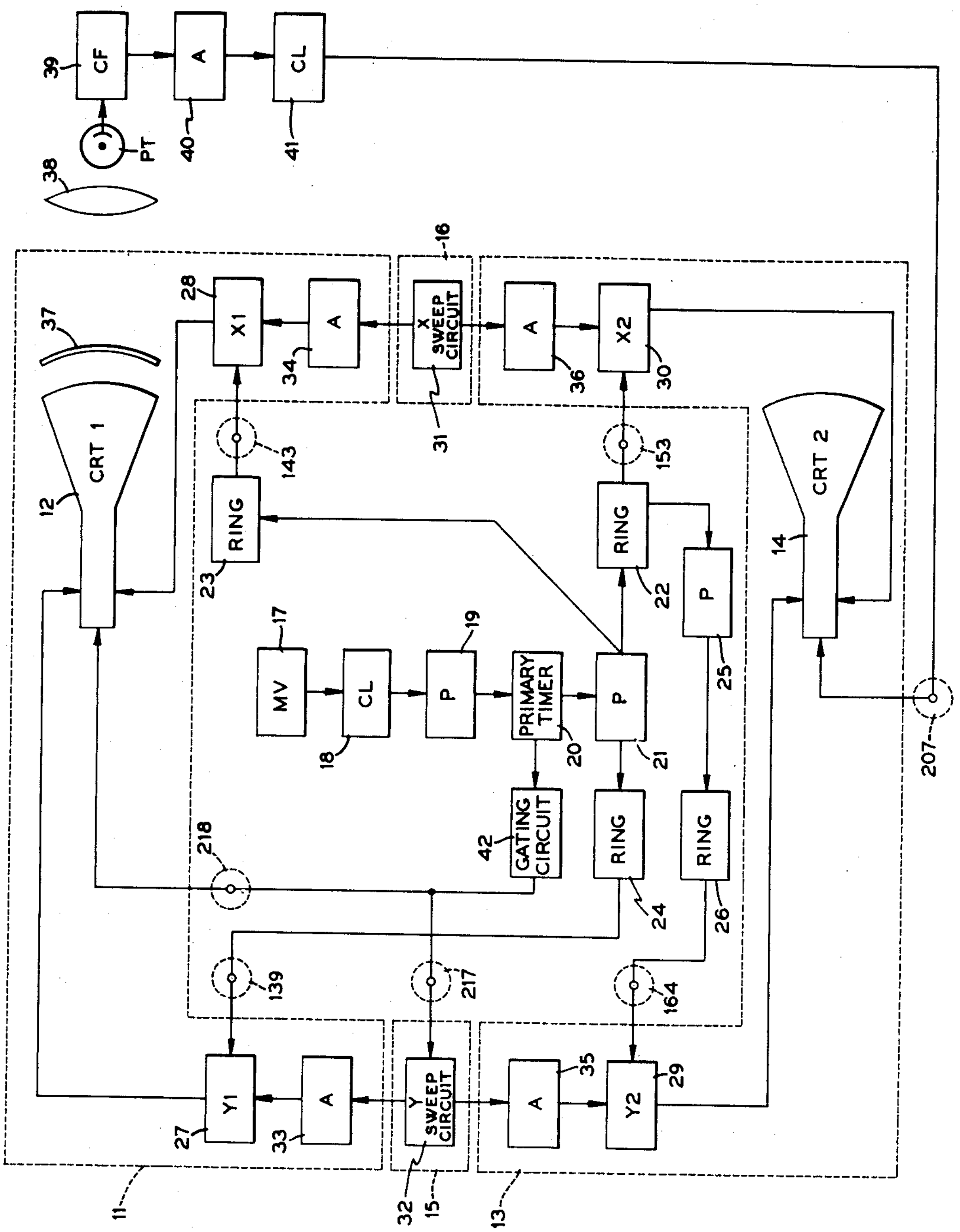
Fig. 1 is a schematic block diagram of the preferred embodiment for cathode ray character synthesis.

As shown in Fig. 1, the schematic block diagram within broken line 11 represents circuit elements associated with selector cathode ray tube 12, and the schematic block diagram within broken line 13 represents circuit elements associated with viewing cathode ray tube 14. The schematic block diagrams within broken lines 15 and 16 represent sweep circuit voltage generators.

A multivibrator 17 generates timed parent voltage pulses which are changed to square wave voltage pulses by a clipper 18, and amplified by a power vacuum tube within circuit 19. Output voltage pulses from the said power tube render triggers included within primary timer 20, on, in a timed relation corresponding to the timed parent pulses generated by multivibrator 17. As the description advances, it will be shown that triggers within primary timer 20 are coupled sequentially to form a closed ring wherein the said triggers are rendered on successively; i. e., for each voltage pulse applied to the said ring, a trigger is rendered "on" as its preceding trigger is rendered "off."

As the description advances, it will be shown that primary timer 20 comprises nine sequentially connected triggers. As the first one of the said nine triggers is rendered "Off" every ninth multivibrator voltage pulse, a corresponding voltage impulse is transmitted to a power vacuum tube within circuit 21 so as to render the said tube conductive. A resulting amplified output voltage impulse from circuit 21 is transmitted simultaneously to character selector rings 23 and 24, and character positioner ring 22.

Each one of the rings 22, 23 and 24 includes seven sequentially connected triggers which are rendered "On" successively; i. e., for each voltage impulse transmitted from the said power tube within circuit 21, one trigger within each of the three said rings is turned "On" as its preceding trigger is turned "Off," and the rings are referred to as having advanced one step. As the first trigger within ring 22 is rendered "On" every sixty-third multivibrator voltage pulse, a corresponding voltage impulse is transmitted to a power tube within circuit 25. A resulting amplified output voltage impulse therefrom to ring 26 causes one trigger of three sequentially connected triggers to turn "On" as its preceding trigger is turned "Off."

Associated with each trigger contained within rings 22, 23, 24 and 26, is a power unit including a power tube rendered conductive when its corresponding trigger is "On." Thus, the said power tubes within each of the said rings are rendered conductive successively in step with their corresponding triggers. Due to the fact that the component values of the aforesaid power units differ for each power unit, the potential output due to any one conducting power tube is of a correspondingly different magnitude.

The aforesaid power tube output voltages from rings 24 and 23 are applied to electron beam positioning circuits 27 and 28, respectively, associated with selector tube 12, and the power output voltages from rings 26 and 22 are applied to electron beam positioning circuits 29 and 30, respectively, associated with viewing tube 14.

In order to synchronize the scanning movements of the electron beams produced within selector tube 12 and viewing tube 14, a common horizontal, or "X," sweep circuit 31, and a common vertical, or "Y," sweep circuit 32 are used. The familiar saw tooth voltages generated by the said sweep circuits are transmitted to the said positioning circuits 27, 28, 29 and 30 after being amplified by circuits 33, 34, 35, and 36, respectively.

The said positioning circuits 27, 28, 29, and 30 are in effect voltage mixer circuits wherein the output voltage from any one positioning circuit is due to the combinative voltages transmitted from a sweep circuit associated therewith, and a ring, also associated with the said one positioning circuit. The output voltages from positioning circuits 27 and 28 are applied to the vertical, or "Y," and horizontal, or "X," electron beam deflection plates, respectively, within selector tube 12; the output voltages from positioning circuits 29 and 30 are applied to the "Y" and "X" electron beam deflection plates, respectively, within viewing tube 14. As is well-known in the electrical art, the position of an electron beam upon the screen of a cathode ray tube is controlled by the potentials applied to the deflection plates arranged therein. Thus, the position and size of the tracing patterns upon the screens of tubes 12 and 14 are determined by the output voltages from the said positioning circuits.

The component values of "X" sweep circuit 31 are such as to cause a plurality of saw tooth voltage pulses to be generated for every one saw tooth voltage pulse generated by "Y" sweep circuit 32; e. g., for the purposes of this description, there are ten "X" saw tooth pulses for each "Y" saw tooth pulse. As a result, each of the electron beams within tubes 12 and 14 completes ten horizontal scanning movements within the time duration of one vertical saw tooth voltage pulse, i. e., each tracing pattern obtained on the screens of the said tubes has the shape of a rectangule comprising ten horizontal lines.

The position of a tracing pattern on the screen of a cathode ray tube is determined by the bias voltages applied to the "X" and "Y" deflection plates. The magnitudes of the said bias potentials are determined by the magnitudes of the output voltages from the aforementioned power units included within rings 22, 23, 24 and 26. By selecting suitable values for the electrical elements connected within the power units associated with each of the triggers included within the said rings 22, 23, 24 and 26, it is possible to shift successively formed tracing patterns as the said rings are advanced.

Figure 3:
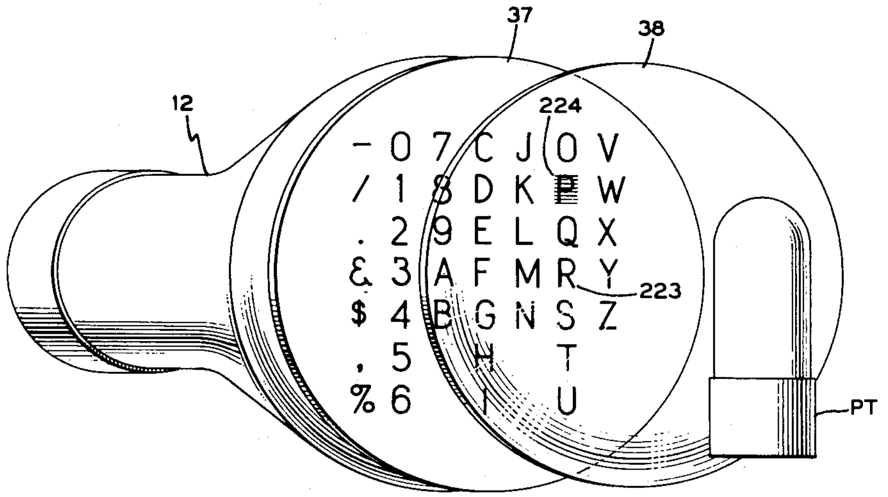
Fig. 3 is a perspective view of the mosaic of characters intermediate the selector tube and the photoelectric tube.

A mosaic, shown more clearly in Fig. 3, consists of transparent and opaque sections arranged so as to form various characters. Each one of the plurality of characters is disposed within an area which is proportional to the area on the screen of selector tube 12 covered by the aforesaid tracing pattern. As a result, it is possible to scan any one of the characters included within mosaic 37 simply by applying suitable biasing voltages to the deflection plates of tube 12.

Sweeping light rays caused by the impingement of the sweeping electron beam upon the fluorescent screen of selector tube 12, pass through the transparent sections of the character within mosaic 37 being scanned by the said light rays in order to energize a photoelectric tube PT. A condenser lens 38 is interposed between mosaic 37 and photoelectric tube PT so as to collect the aforesaid light rays, and to focus them onto the cathode of tube PT. During the time that tube PT is energized, a voltage pulse is transmitted to clipper 41 via cathode follower circuit 39 and amplifier circuit 40. A resulting output voltage pulse from clipper 41 raises the bias potential of viewing tube 14 so as to render its electron beam "On." Due to the fact that the time duration of the output voltage pulse from clipper 41 is equal to the time duration that photoelecric tube PT is energized, and due to the fact that the sweeping movements of the electron beams within tubes 12 and 14 are synchronized, a facsimile of the character scanned by the light rays emitted from the fluorescent screen of selector tube 12 is reproduced on the screen of viewing tube 14. The position of the character reproduced on the screen of viewing tube 14 is determined by the bias voltages applied to the deflection plates of said tube, and the magnitude of these bias voltages is determined by the output voltages of rings 22 and 26.

The input to gating circuit 42 is connected to primary timer 20 so that the said circuit 42 transmits a controlled blanking voltage to selector tube 12 and to "Y" sweep circuit 32 for a predetermined length of time. As the description advances, it will be shown that the aforementioned blanking voltage from circuit 42 is effective for the time required to advance rings 22, 23, 24 and 26 one step. Referring to mosaic 37 shown in Fig. 3, the time duration of the aforesaid blanking voltage is sufficient to permit shifting of the electron beam from the end of one tracing pattern corresponding to a character completely scanned, to the start of another tracing pattern corresponding to any other character to be scanned.

*Primary Timer*

Figure 2A:
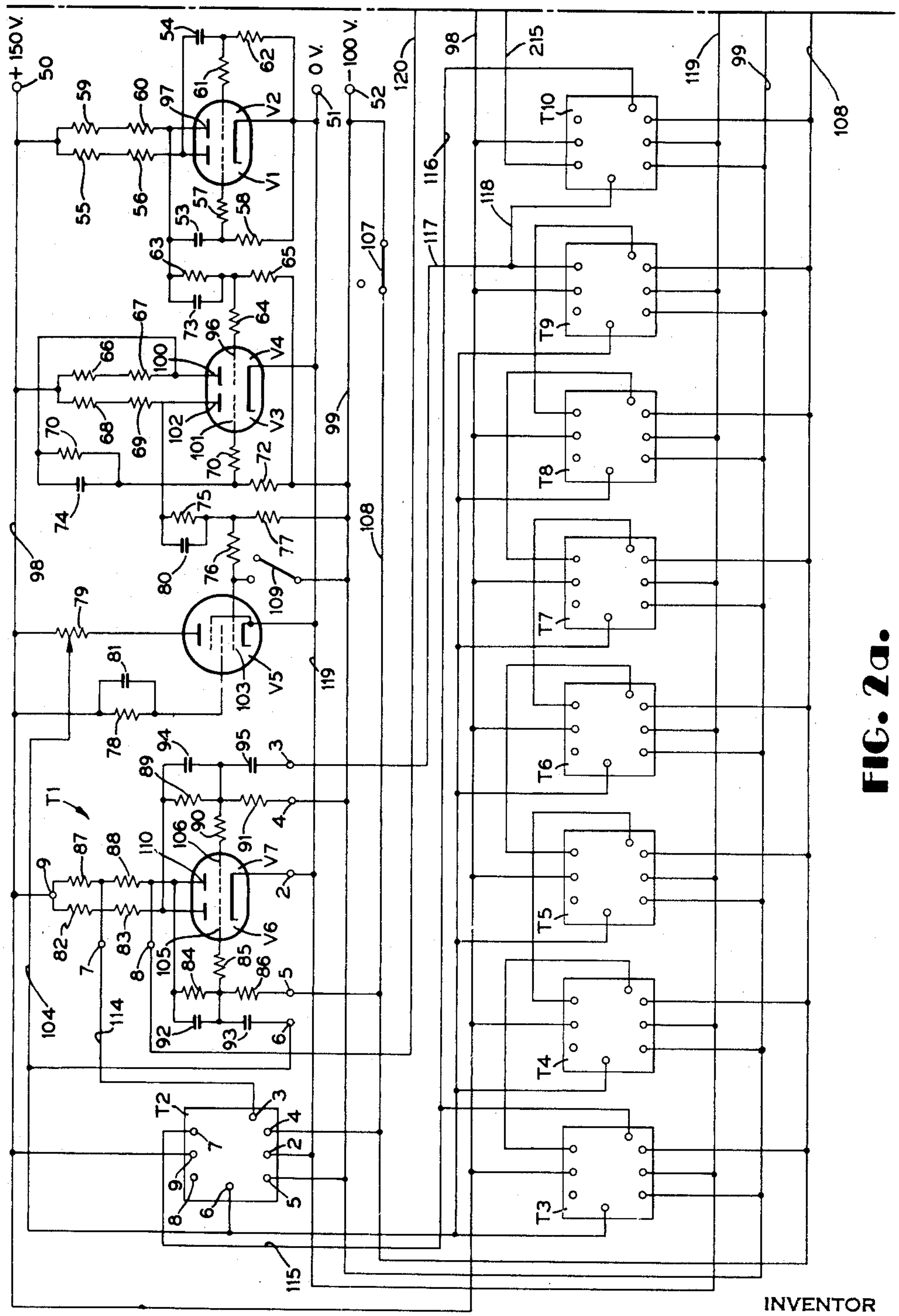
Fig. 2 is a schematic circuit diagram of the said preferred embodiment.

Referring to Fig. 2*a*, a voltage source including terminals 50, 51 and 52 affords suitable operating potentials; e. g., +150 volts, zero volts and −100 volts, respectively. Multivibrator 17 (Fig. 1) is shown comprising reciprocally capacity-coupled vacuum tube triodes V1 and V2, condensers 53 and 54, and resistors 55 to 62; clipper 18 (Fig. 1) is shown comprising vacuum tube triodes V3 and V4, resistors 63 to 72, and condensers 73 and 74; inverter power amplifier 19 (Fig. 1) is shown comprising vacuum tube pentode V5, resistors 75 to 79, and condensers 80 and 81; and trigger T1 is shown comprising reciprocally resistance-coupled vacuum tube triodes V6 and V7, resistors 82 to 91, and condensers 92 to 95. In order to avoid undue complexity, the remaining nine triggers T2 to T10 within primary timer 20 (Fig. 1) are shown as blocks. Each of the said blocks represents a trigger which is identical to trigger T1. Electrical connections are completed to each of the said triggers at terminals 2, 3, 4, 5, 6, 7, 8 and 9 as indicated in Fig. 2*a*.

The multivibrator 17, clipper 18 and trigger T1 are shown and described in application, Serial No. 38,078, filed July 9, 1948 now U. S. Patent No. 2,658,681 dated November 10, 1953. As a result, they will be described only briefly.

Referring to Fig. 2*a*, tubes V1 and V2 included within multivibrator 17 (Fig. 1) have normally conducting grids which are reciprocally capacity-coupled to the anodes of the said tubes. As a result, tubes V1 and V2 are rendered conductive alternately, and the said multivibrator oscillates at a frequency determined primarily by the values of elements 53, 58, 54 and 62. A resulting series of parent voltage pulses is applied to the control grid 96 of tube V4 from anode 97 of tube V2. Said grid 96 is connected intermediate resistors 63 and 65, and the said resistors in series circuit with resistors 59 and 60 form a voltage divider connected, at one end, to a +150 volt line 98, and, at the other end, to a −100 volt line 99. The bias applied to the said grid 96 from the point intermediate resistors 63 and 65 renders tube V4 conductive only during the time that tube V2 is non-conductive. Due to the fact that anode 100 of tube V4 is connected to control grid 101 of tube V3, tube V3 is rendered conductive only during the time that tube V4 is non-conductive. As a result of the foregoing, and the additional fact that tubes V3 and V4 are over-driven triodes, square wave voltage pulses appear at anode 102. The frequency of the said square wave pulses is the same as the frequency at which multivibrator 17 oscillates.

The said square wave pulses are applied to control grid 103 of tube V5 through resistors 75 and 76 and condenser 80, so that corresponding inverted square wave voltage pulses appear across load resistor 79. The movable arm of resistor 79 is positioned so that the magnitude of the square wave voltage pulses appearing at line 104 is of a suitable value for trigger circuit operation; e. g., forty volts.

The reciprocally resistance-coupled tubes V6 and V7 of trigger T1 are rendered conductive alternately in order to maintain the said trigger at one of two stable conditions, i. e., "on" and "off." As mentioned hereinbefore, when the left side of the trigger is conducting, the trigger is arbitrarily described as being "on." When the right side of the trigger is conducting, the trigger is arbitrarily described as being "off." The said trigger may be shifted from one state of equilibrium to the other one, e. g., "on" to "off," simply by applying suitable minus voltage pulses simultaneously to grids 105 and 106 via terminals 6 and 3, respectively. If, for example, tube V6 is conducting, and minus voltage pulses are applied simultaneously to the said grids via terminals 3 and 6, trigger T1 will flip, and tube V7 rendered conductive. A second negative voltage pulse applied to both terminals 3 and 6, will flip the trigger once more, rendering tube V6 conducting. In addition to the foregoing means, the trigger may be shifted from one stable state to the other one by applying a suitable minus voltage pulse to the control grid of the one tube that is conducting; e. g., applying a negative pulse to grid 106 via terminal 3 when tube V7 is conducting.

As shown in Fig. 2*a*, primary timer 20 (Fig. 1) includes sequentially coupled triggers T1 to T9, and trigger T10. As the description advances, it will be shown that trigger T10 is turned "off" when trigger T9 is turned "off," and turned "on" when trigger T3 is turned "on," in order to control gating switch 42 (Fig. 1). The said triggers are reset to a normal status when switch 107 is opened in order to remove the −100 volts from reset line 108. Trigger T1 is reset to the "on" state, whereas triggers T2 to T10 are reset to the "off" state. Switch 109 is connected, at one end, to grid 103 of tube V5, and, at the other end, to −100 volt line 99. When the said switch 109 is closed, tube V5 is biased beyond cut-off, and there is an absence of multivibrator pulses at line 104. Hence, the said switch is open under normal operating conditions.

The square wave voltage pulses appearing across resistor 79 in a timed relation with the multivibrator oscillations are applied to the left grids of triggers T1 to T9 via their respective terminals 6 and common line 104. Upon opening switch 109 after reset, the first negative pulse flips trigger T1 "off." When trigger T1 is turned "off," the potential at anode 110 decreases sharply due to an increased voltage drop across resistors 87 and 88, and the voltages at terminals 7 and 8 decrease correspondingly thereto. This negative voltage impulse is applied to terminal 3 of trigger T2 from terminal 7 of trigger T1 via wire 114, thereby rendering trigger T2 "on."

A second negative voltage pulse on line 104 after reset, flips trigger T2 "off." A corresponding negative impulse from terminal 7 of trigger T2 to terminal 3 of trigger T3 via wire 115 renders trigger T3 "on." The said impulse from terminal 7 of trigger T2 is also applied to terminal 3 of trigger T10 via wires 115 and 116. Due to the fact that trigger T10 is rendered "off" during reset, it is turned "on" by the aforesaid impulse.

Similarly, a third negative voltage pulse along line 104 after reset, flips trigger T3 "off" and renders trigger T4 "on." With each succeeding negative pulse on line 104, triggers T5, T6, T7, T8 and T9 are each rendered "on" singly in succession. When trigger T9 is turned "off," a negative voltage impulse from terminal 7 of trigger T9 is applied to terminal 3 of trigger T1 via wire 117, and to terminal 6 of trigger T10 via wire 118. This impulse renders trigger T1 "on," and trigger T10 "off." As described previously, trigger T10 is thereafter turned "on" when trigger T3 is turned "on."

Summarizing the operation of the primary timer, triggers T1 to T9, coupled to form a closed ring, are each rendered "on" in succession for each negative voltage pulse appearing at line 104; trigger T10 is rendered "off" when trigger T9 is rendered "off," and trigger T10 is rendered "on" when trigger T3 is rendered "on." Thus, nine multivibrator pulses are required to advance the said primary ring once around.

*Character selection rings*

As is shown in Fig. 3, a mosaic 37 consists of transparent and opaque sections arranged so as to form various characters. Inserting the said mosaic intermediate the fluorescent screen of selector tube 12 and photoelectric tube PT causes the said photoelectric tube to convert any light rays passing through the transparent sections of the said mosaic into corresponding voltage pulses. By positioning the sweeping electron beam within tube 12 so that its complete tracing pattern covers only one character within the said mosaic, the correspondingly sweeping light rays passing through the said mosaic represent the character being scanned. Thus, voltage pulses transmitted from photoelectric tube PT represent the character being scanned, and selected characters may be successively scanned by controlling the position of the tracing pattern on the screen of tube 12.

The manner by which character selection rings 23 and 24 (Fig. 1) position the said tracing pattern on the screen of tube 12 (Fig. 3) so as to permit successive scanning of selected symbols will now be explained. The said closed rings comprising triggers T11 to T17, and T18 to T24 (Fig. 2*b*), permit the said tracing pattern to be positioned anywhere on the screen of selector cathode ray tube 12 corresponding to the seven rows of seven symbols each within mosaic 37.

Figure 2B:
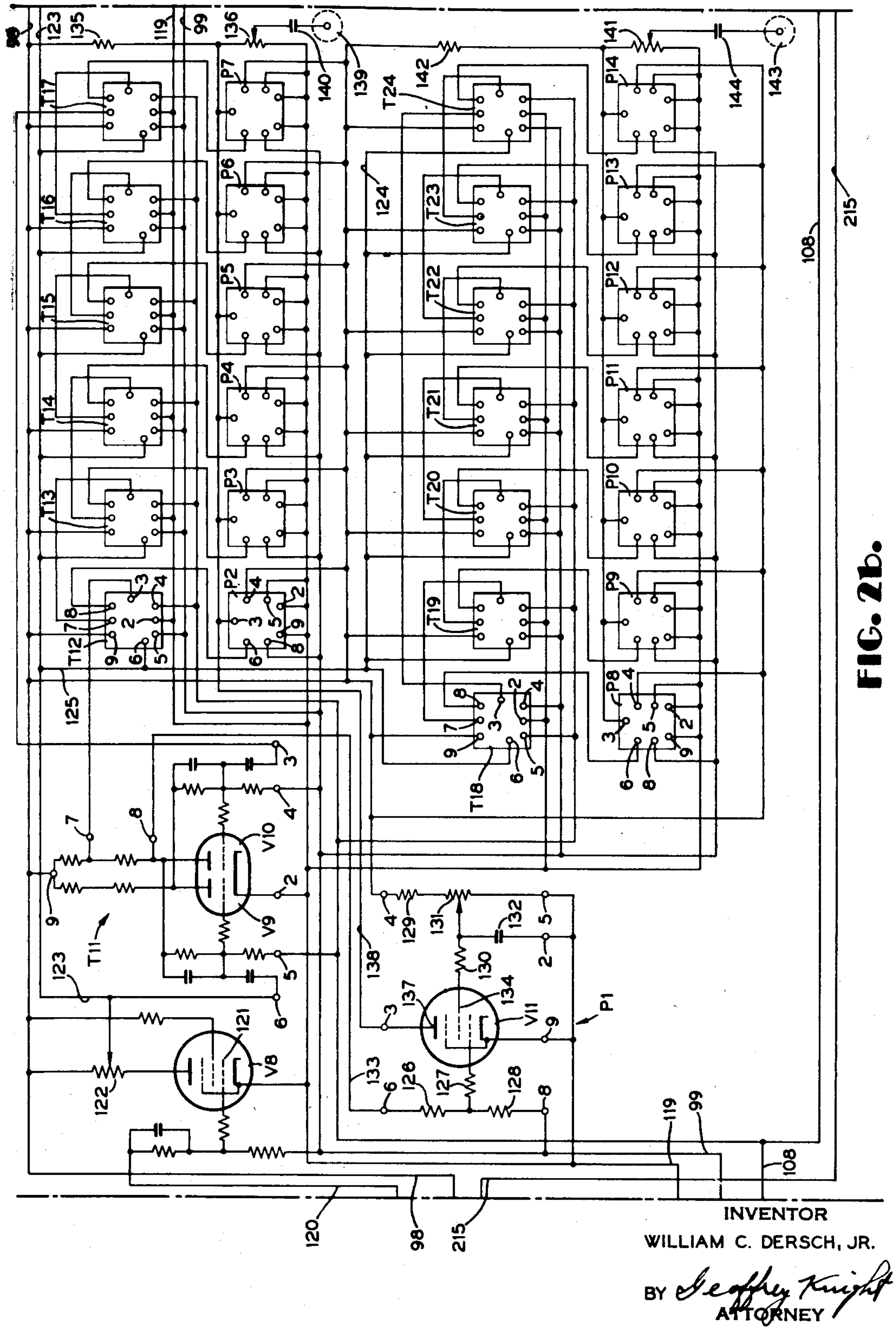

Every time trigger T1 (Fig. 2*a*) is rendered "on," the potential at anode 110 increases. This positive voltage impulse is transmitted along wire 120 from terminal 8 of trigger T1 to control grid 121 of vacuum tube pentode V8 (Fig. 2*b*) in order to render tube V8 conductive for the time duration of the said impulse. The values of resistor and condenser elements connected to tube V8 are the same as similar elements connected to tube V5 (Fig. 2*a*). Referring to Fig. 2*b*, the increased current flow through tube V8 when the said tube is conducting, causes an increased voltage drop across load resistor 122. This appears as a negative voltage impulse along line 123, and line 124 connected to line 123 by wire 125. The movable arm of resistor 122 is positioned so that the magnitude of the pulses appearing at line 123 is suitable for trigger circuit operation; e. g., forty volts.

Triggers T12 to T24 are each identical to trigger T11. When reset switch 107 (Fig. 2*a*) is opened, triggers T11 and T18 are reset to the "on" state, and triggers T12 to T17, and T19 to T24 are reset "off." Thereafter, each negative voltage impulse along lines 123 and 124 causes the said triggers within each closed ring to flip "on" successively as the preceding trigger is turned off.

Each trigger T11 to T24 has associated therewith a power unit P1 to P14, respectively. Due to the fact that the said power units are similar to one another, and in order to avoid undue complexity, the circuit diagram for only power unit P1 is shown and the remaining power units are shown as blocks. Power unit P1 includes a vacuum tube pentode V11, resistors 126 to 130, a potentiometer 131, and a condenser 132. Electrical connections are completed to the said elements within the said power unit via suitable unit terminals 2, 3, 4, 5, 6, 8 and 9.

Tube V11 is rendered conductive during the time that trigger T11 is "on" due to a resulting positive voltage impulse transmitted via wire 133 from terminal 8 of trigger T11 to terminal 6 of power unit P1. However, the amount of current flowing through tube V11 when it is conducting, is determined by the potential at screen grid 134, and this potential is controlled by the setting of screen grid biasing potentiometer 131. Potentiometer 131 and resistor 129 form a voltage divider which is connected, at one end, to line 98, and, at the other end, to line 119.

A voltage divider comprising common power unit load resistor 135 and potentiometer 136 is also connected, at one end, to line 98, and, at the other end, to line 119. Due to the fact that anode 137 of tube V11 is connected to a point intermediate resistor 135 and potentiometer 136 vial terminal 3 of power unit P1 and common line 138, the voltage drop across load resistor 135 when tube V11 is conducting, is determined by the setting of screen grid potentiometer 131. Due to the fact that resistor 135 and potentiometer 136 are connected in series circuit, the voltage drop across potentiometer 136 decreases as the voltage drop across resistor 135 increases. Thus, during the time that tube V11 is rendered conductive, the resulting anode current flow through resistor 135 causes a negative voltage impulse at terminal 139 via condenser 140 which has a large capacitive value. It may be seen from the foregoing description that the magnitude of the voltage at terminal 139 is in effect determined by the setting of screen grid potentiometer 131.

The terminals 3 for power units P2 to P7 are each connected to line 138, therefore resistor 135 is common to the vacuum tubes within the said power units P1 to P7. Consequently, the voltage drop across resistor 135 is determined by the magnitude of current flow through the vacuum tube within the power unit corresponding to a trigger in the "on" state. Accordingly, the magnitude of the voltage impulse at terminal 139 is determined by the voltage drop across resistor 135. Each of the power units P2 to P7 includes a screen grid biasing potentiometer similar to potentiometer 131 in order to control the potential at terminal 139 by the setting of the screen grid potentiometer within the power unit corresponding to a trigger that is rendered "on."

Similarly, the potential at terminal 143 at any given period is controlled by the setting of a screen grid biasing potentiometer within the power unit P8 to P14 corresponding to its respective trigger T18 to T24 rendered "on." The said screen grid biasing potentiometers are each similar to potentiometer 131. Due to the fact that potentiometer 141 and common load resistor 142 form a voltage divider similar to the one comprising resistor 135 and potentiometer 136, and anode terminals 3 of power units P8 to P14 are connected to a point intermediate elements 142 and 141, a voltage impulse is transmitted to terminals 143 via condenser 144.

As shown in Fig. 1, terminals 139 and 143 are connected to positioning circuits 27 and 28, respectively, which are connected to the "Y" and "X" deflection plates, respectively, within selector tube 12. The voltage applied to the "Y" deflection plate is a combinative one due to the potential at terminal 139 and the voltage generated by sweep circuit 32. Similarly, the voltage applied to the "X" deflection plate is a combinative one due to the potential at terminal 143 and the voltage generated by sweep circuit 31. Thus, the position of the cathode ray tube electron beam is controlled by the resultant electrostatic field caused by the said combinative deflecting plate voltages. As mentioned hereinbefore, these voltages are such as to position a rectangular shaped tracing pattern on the screen of selector tube 12 so that a selected character within mosaic 37 is scanned.

*Character positioner rings*

Figure 4:
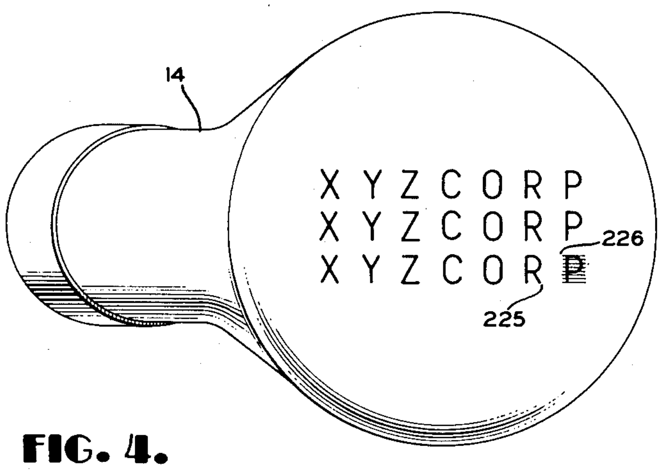
Fig. 4 is a perspective view of the viewing tube showing succeeding characters positioned in a sequential order across the screen of the said viewing tube.

The character positioner rings 22 and 26 (Fig. 1) cause succeeding characters formed on the screen of viewing tube 14 (Fig. 4) to be arranged thereon in a sequential order. The said closed rings comprising triggers T25 to T31, and T32 to T34 (Fig. 2*c*), permit seven succeeding characters to appear in each of three succeeding lines (Fig. 4).

Figure 2C:
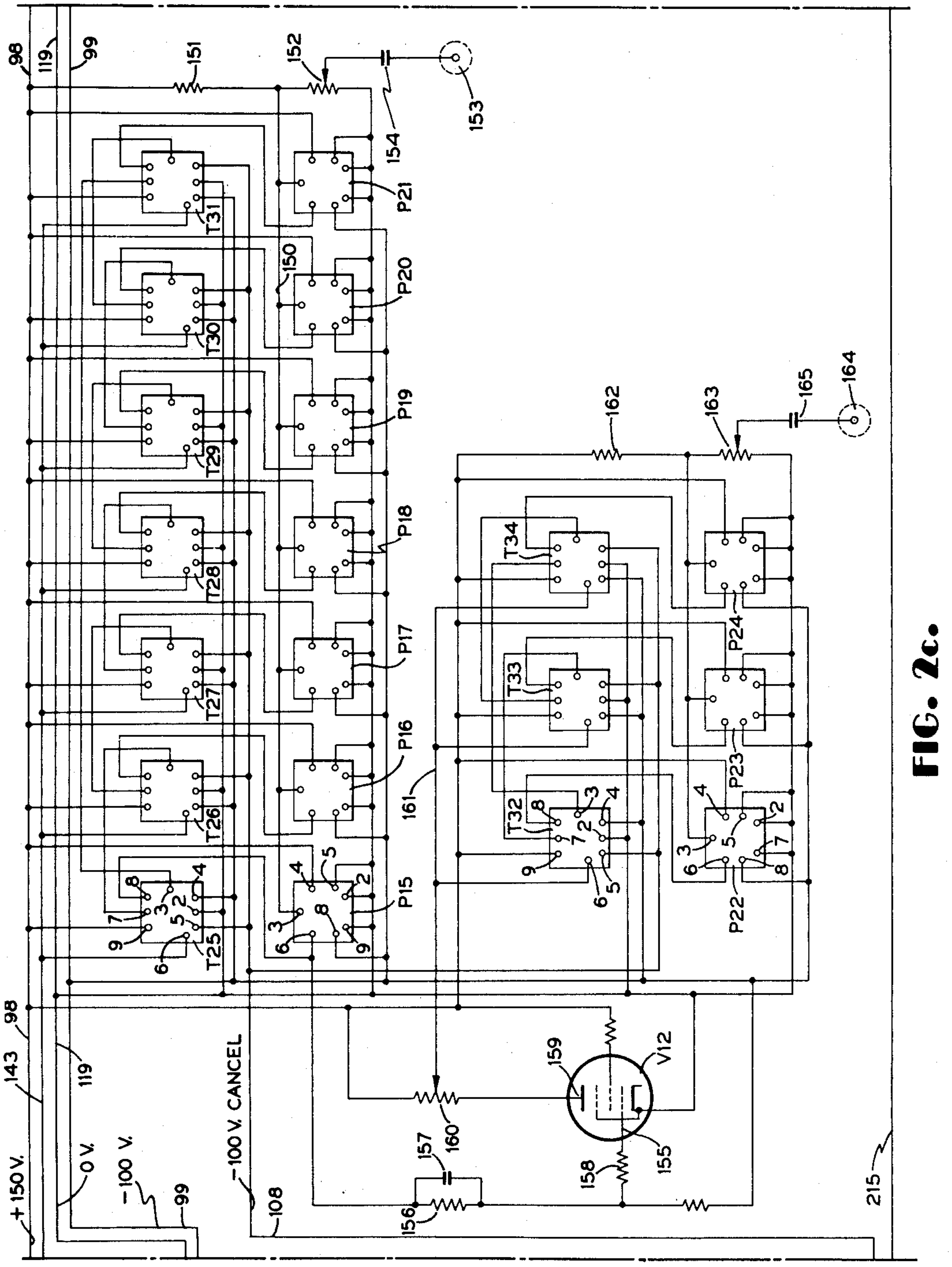

Referring to Fig. 2*c*, triggers T25 to T31, each of which is similar to trigger T11 (Fig. 2*b*), are coupled sequentially to complete a closed ring, and triggers T32 to T34, each of which is similar to trigger T11, are coupled sequentially to form a second closed ring. The terminals 6 of triggers T25 to T31 are connected to line 123 which is connected, at one end, to the movable arm of potentiometer 122 (Fig. 2*b*). Due to the fact that terminals 6 of triggers T11 to T24 (Fig. 2*b*) are also connected to line 123 so as to receive voltage pulses transmitted thereon, the individual rings comprising triggers T11 to T17, T18 to T24, and T25 to T31, advance one step per voltage pulse simultaneously.

Each of the triggers T25 to T31 has associated therewith a power unit P15 to P21, respectively. The anode connecting terminals 3 of power units P15 to P21, each of which is similar to power unit P1 (Fig. 2*b*), are connected to common line 150 which is connected, at one end, to a point intermediate load resistor 151 and potentiometer 152.

The said elements 151 and 152 form a voltage divider which is connected, at one end, to line 98, and, at the other end, to line 119. Each of the power units P15 to P21 contains a screen grid biasing potentiometer similar to potentiometer 131 (Fig. 2*b*) so as to control the magnitude of the voltage impulse at terminal 153 by the setting of the potentiometer within the power unit P15 to P21 corresponding to a trigger T25 to T31 rendered "on." The said impulse is transmitted to terminal 153 from potentiometer 152 via condenser 154.

As shown in Fig. 2*c*, when trigger T25 is rendered "on," a positive impulse is transmitted from terminal 8 of the said trigger to terminal 6 of power unit P15 so as to render the vacuum tube within the said power unit conductive. The said positive impulse is also applied to the control grid 155 via elements 156, 157 and 158 in order to render vacuum tube pentode V12 conductive. Anode 159 is connected to the +150 volt line 98 through potentiometer 160, therefore a negative voltage impulse is applied to line 151 every time tube V12 is conducting. The movable arm of potentiometer 160 is positioned so that the magnitude of voltage pulses applied to line 161 is suitable for operating triggers; e. g., forty volts. From a reading of the foregoing, it is apparent that a negative voltage impulse is applied to line 161 whenever trigger T25 is rendered "on." Due to the fact that terminals 6 of each of the triggers T32 to T34 are connected to said line 161, the closed ring comprising the said triggers is advanced one step when trigger T25 is rendered "on."

Associated with each trigger T32 to T34 is a power unit P22 to P24, respectively, which is similar to power unti P1 (Fig. 2*b*). As anode terminal 3 of each power unit P22 to P24 is connected to a voltage divider comprising common load resistor 162 and potentiometer 163, the magnitude of a voltage impulse transmitted to terminal 164 via condenser 165 is determined by the voltage drop across load resistor 162; and, as explained hereinbefore, the magnitude of a voltage drop across the said common load resistor is controlled by the setting of the screen grid biasing potentiometer within the power unit corresponding to a trigger in the "on" state.

As shown in Fig. 1, terminals 164 and 153 are connected to positioning circuits 29 and 30, respectively, which are connected to the "Y" and "X" deflection plates, respectively, within viewing tube 14. The positioning of the cathode ray tube electron beam is controlled by a resultant electrostatic field caused by combinative deflection plate voltages due to the potentials at terminals 164 and 153, and sweep circuits 29 and 30. As mentioned hereinafter, these voltages are such as to position a rectangular shaped tracing pattern on the screen of tube 14 so that the characters reproduced are positioned thereon sequentially.

*Photoelectric sensing circuit*

Figure 2D:
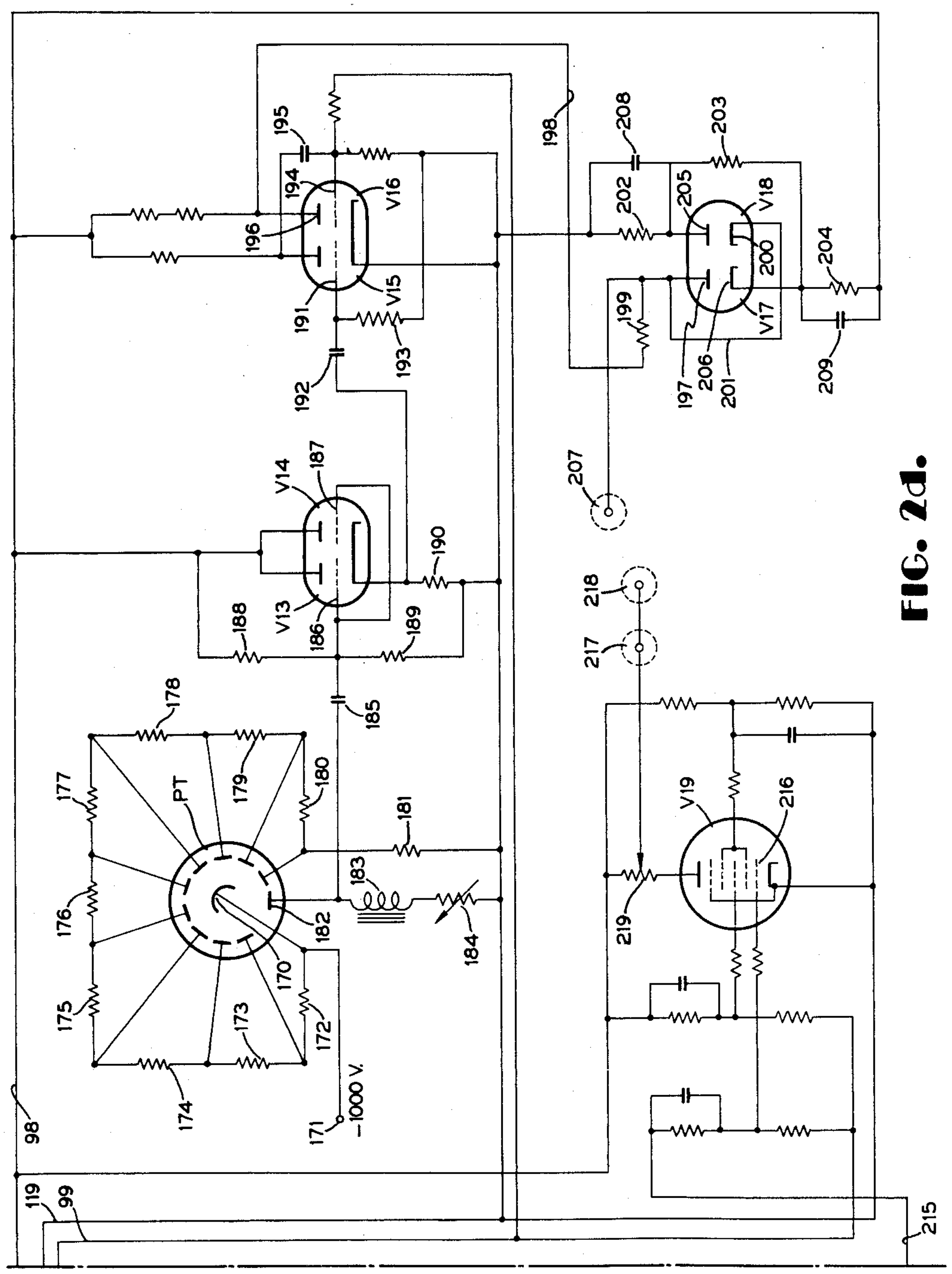

As is shown in Fig. 2*d*, cathode 170 of photoelectric tube PT is connected to a voltage source terminal 171 which is maintained at a potential suitable for photoelectric tube operation; e. g., —1000 volts. A voltage divider comprising equal value resistors 172 to 181 is connected, at one end, to terminal 171, and, at the other end, to the zero volt line 119. Each dynode within tube PT, preferably a type 931–A multiplier photoelectric tube, is connected to the said voltage divider so that there is an equal voltage differential between adjacent dynodes, i. e., 100 volts. Anode 182 is connected to line 119 via coil 183 and variable load resistor 184. Element 183 is used to compensate for stray capacity caused by connections to the photoelectric sensing circuit.

When light rays impinge upon cathode 170, tube PT is energized, thereby causing a negative voltage pulse to be applied via condenser 185 at the control grids 186 and 187 of vacuum tube triodes V13 and V14, respectively. A voltage divider comprising resistors 188 and 189 is connected, at one end, to line 98, and, at the other end, to line 119. Due to the fact that grids 186 and 187 are connected to a point intermediate resistors 188 and 189, the said tubes are normally rendered conductive. The said negative pulse from photoelectric tube PT decreases this bias voltage at the said grids of tubes V13 and V14 so as to decrease the voltage drop across cathode resistor 190. Thus, a negative pulse is applied to the control grid 191 of tube V15 via condenser 192.

Amplifier circuit 40 (Fig. 1) includes vacuum tube triodes V15 and V16. Tube V15 is normally rendered conductive by the zero bias voltage applied to control grid 191 via resistor 193 which is connected to the zero volt line 119. When a negative pulse is applied to grid 191 via condenser 192, tube V15 is rendered less conductive, and a corresponding positive voltage pulse is transmitted to control grid 194 of tube V16 via condenser 195, thereby rendering tube V16 conductive. As a result, the potential at anode 196 of tube V16 decreases, and a corresponding negative pulse in transmitted to clipper 41 (Fig. 1) comprising vacuum tube diodes V17 and V18. The said pulse is applied to anode 197 of tube V17 via wire 198 and resistor 199, and to cathode 200 of tube V18 via wire 201.

A voltage divider comprising resistors 202, 203 and 204 is connected, at one end, to line 119, and, at the other end, to line 98. Anode 205 is connected to a point intermediate resistors 202 and 203 whereas cathode 206 is connected to a point intermediate resistors 203 and 204. The values selected for elements 202, 203 and 204 maintain anode 205 and cathode 206 at potentials at which the said clipper circuit is to be effective. When a negative pulse is transmitted via wire 198, tube V18 conducts during the time that the magnitude of the said pulse is less than the potential at anode 205, and tube V17 conducts during during the time that the magnitude of the said pulse is greater than the potential at cathode 206. Due to the fact that the value of resistor 199 is considerably greater than the internal resistance of either tube V17 or V18, the potential differential at terminal 207 is essentially the same as the potential differential between anode 205 and cathode 206. In other words, a pulse transmitted along wire 198 will be "clipped" when its potential exceeds the voltage at cathode 206, and is less than the voltage at anode 205. Condensers 208 and 209 are inserted in order to maintain the potentials at anode 205 and cathode 206 constant for a predetermined length of time while tubes V17 and V18 are conducting.

As shown in Fig. 1, terminal 207 is connected to the biasing, or "Z," control of viewing tube 14. Actually, terminal 207 is connected to the cathode of tube 14 so that a negative pulse transmitted from photoelectric tube PT biases the cathode ray tube electron beam "on" for the duration of time that tube PT is energized.

*Blanking voltage circuit*

As mentioned hereinbefore in the general description, a blanking voltage is applied to selector cathode ray tube 12 (Fig. 1) in order to render its electron beam "off" during a time in which the said electron beam is shifted from the end of one tracing pattern corresponding to a character completely scanned, to the start of another tracing pattern corresponding to any other character to be scanned.

When trigger T10, shown in Fig. 2*a*, is reset "off," a negative voltage impulse is transmitted via wire 215 to grid 216 of vacuum tube V19 (Fig. 2*d*). As a result, a corresponding inverted impulse is applied to sweep circuit 32 and tube 12 via terminals 217 and 218, respectively. This positive impulse biases sweep circuit 32 sufficiently to prevent an output sweep signal therefrom. Due to the fact that terminal 218 is connected to the cathode of tube 12, the same said positive impulse renders its electron beam "off."

The negative impulse from terminal 7 of trigger T2 that flips trigger T3 "on" also renders trigger T10 "on" via line 115 and 116. A resulting positive impulse is applied to grid 216, and causes an increased current flow through tube V19. A corresponding inverted impulse due to an increased voltage drop across load resistor 219 is transmitted to terminals 217 and 218. As a result of this negative impulse, sweep circuit 32 is biased so as to be operative, and the electron beam within tube 12 is rendered "on."

During the time that triggers T3 to T9 are sequentially turned "on" by successive pulses along line 104, one complete tracing pattern is traced on the screen of selector tube 12 because trigger T10 is "on."

When trigger T9 is rendered "off," a negative impulse from terminal 7 causes triggers T1 and T10 to flip "on." As a result, a positive impulse is again transmitted via line 215 in order to apply a blanking voltage to sweep circuit 32 and selector tube 12, and a concurrent negative impulse is transmitted via line 120 in order to advance rings 22, 23 and 24 one step.

*Summary*

In order to show more clearly the method by which a selected character within a mosaic is scanned by a cathode ray tube, and positioned on the screen of a second cathode ray tube by synthesizing a series of spots and lines appearing thereon, it is assumed that the twenty-first character to be successively reproduced by the aforesaid means is the letter "P."

Referring to Fig. 4, each of the first seven letters, "XYZ CORP," is formed on the screen of viewing tube 14, as character selection rings 23 and 24, and character positioner ring 22 (Fig. 1) are each advanced one step simultaneously. After the seventh letter, "P," is reproduced by synthesis, the first trigger within each of the aforesaid closed rings is rendered "on," thereby causing character positioner ring 26 (Fig. 1) to advance one step. This causes each of the second set of seven characters to be positioned sequentially in a second row as said rings 22, 23 and 24 are advanced simultaneously. After the fourteenth letter, "P," is reproduced on the screen of tube 14, said ring 26 (Fig. 1) is caused to advance one more step, whereby each of the third set of seven characters is positioned sequentially in a third row.

After the twentieth letter, "R," is reproduced, each of the rings 22, 23 and 24 is advanced one step simultaneously when trigger T1 (Fig. 2*a*) is rendered "on." At this time a positive impulse is transmitted via wire 120 from terminal 8 of trigger T1 (Fig. 2*a*), and a corresponding negative impulse is transmitted via lines 123 and 125 in order to render triggers T17, T24 and T31 "on" (Figs. 2*b* and 2*c*), and the vacuum tubes within their respectively associated power units P7, P14 and P21, conductive. Trigger T34 remains in the "on" state of equilibrium, and the vacuum tube without power unit P24 remains conductive.

Screen grid biasing potentiometers within character selecting power units P7 and P14 cause the potentials at terminals 139 and 143 to shift the electron beam within selector tube 12 from the end position 223 of the letter "R" to the start position 224 of the letter "P" (Fig. 3). Due to the fact that trigger T10 is rendered "off" when trigger T1 is rendered "on," a negative impulse via line 215 to grid 216 (Fig. 2*d*) causes a positive blanking voltage to be applied to sweep circuit 32 and selector tube 12 via terminals 217 and 218, respectively (Fig. 1).

After trigger T1 is rendered "on," a subsequent multivibrator pulse renders trigger T2 "on." A third multivibrator pulse renders triggers T3 and T10 "on." This causes a positive impulse to be applied to grid 216 (Fig. 2*d*) via line 215 so that sweep circuit 32 is rendered operative and the electron beam within selector tube 12 is rendered "on." The sweep voltages applied to the selector tube deflection plates cause the electron beam therein to complete a tracing pattern comprising a series of horizontal scanning lines as shown in Fig. 3. The scanning of the letter "P" is completed within a time period of seven multivibrator pulses; i. e., during the time that triggers T3 to T9 are successively rendered "on."

When the selector tube electron beam is shifted from position 223 to position 224, the electron beam within viewing tube 14 is shifted from the end position 225 of the last letter formed thereon to the start position 226 of the area in which the letter "P" is to be formed (Fig. 4). The shift of the viewing tube electron beam is caused by the potentials at terminals 153 and 164 which are determined by the setting of screen grid biasing potentiometers within power units P21 and P24 (Fig. 2*c*). The sweep voltages applied to the viewing tube deflection plates cause the electron beam therein to complete a tracing pattern similar to the one on the screen of selector tube 12 (Fig. 4).

The outline of the letter "P" on mosaic 37 is a transparent material. As light rays emitted from the fluorescent screen of tube 12 scan the area in which the said letter "P" is disposed, photoelectric tube PT is energized by the said rays passing through the said mosaic. Due to the fact that the electron beam within viewing tube 14 is rendered "on" when tube PT is energized, and due to the fact that the sweeps of the electron beams within tubes 12 and 14 are synchronized, an outline of the letter "P" is formed on the fluorescent screen of tube 14 by synthesis.

While there have been shown and described the fundamental novel features of the invention as applied to a preferred embodiment, it will be understood that various omissions and substitutions and changes in the form and details of the device may be made by those skilled in the art, without departing from the spirit of the invention. It is the intention, therefore, to be limited only as indicated by the scope of the following claim.

What is claimed is:

A symbol data recording device of the class described comprising a first cathode ray tube including means for producing cathode rays, a screen having the property of emitting light energy under the influence of said cathode rays, and a cathode ray accelerating means for causing said cathode rays to impinge said screen so as to produce said light energy, in combination with a mosaic of transparent and opaque symbol-containing masks disposed relative said screen for modifying said light energy emitted thereby correspondingly to symbols represented by said symbol-containing masks, a photoelectric sensing means positioned relative said mosaic so as to be influenced by said light energy emitted from said screen and modified by said mosaic, cathode ray deflecting means for causing said cathode rays to scan in a plurality of different random selected orders a plurality of regions of said screen corresponding to a plurality of masks of said mosaic representing data to be recorded, a second cathode ray tube including means for producing cathode rays and a screen, cathode ray deflecting means associated with said second cathode ray tube for causing the cathode rays thereof to scan in a sequential order and in synchronism with the cathode rays of said first cathode ray tube each of a plurality of regions of said second cathode ray tube screen arranged in each of a plurality of rows so as to effect a region-by-region row-by-row scan, and means for modulating the cathode rays of said second cathode ray tube in accordance with voltage pulses derived from said photoelectric sensing means in response to said light energy influencing said photoelectric sensing means so as to reproduce symbols in a sequential order on said second cathode ray tube screen corresponding to the symbol-containing masks scanned, whereby a plurality of reproduced symbols are arranged across the screen of said second cathode ray tube in each of a plurality of rows.

References Cited in the file of this patent

UNITED STATES PATENTS

| | | |
|---|---|---|
| 2,267,827 | Hubbard | Dec. 30, 1941 |
| 2,314,920 | Bumstead | Mar. 30, 1943 |
| 2,379,880 | Burgess | July 10, 1945 |
| 2,433,340 | Burgess | Dec. 30, 1947 |
| 2,538,065 | Wallace | Jan. 16, 1951 |
| 2,575,017 | Hunt | Nov. 13, 1951 |